3,827,871
COATING PROCESS FOR GLASS CONTAINERS
Sidney Maurice Budd, Edgware, England, assignor to United Glass Limited, Staines, Middlesex, England
No Drawing. Filed Nov. 23, 1971, Ser. No. 201,308
Int. Cl. C03c 15/00, 17/00
U.S. Cl. 65—60  6 Claims

ABSTRACT OF THE DISCLOSURE

A method of manufacturing glass containers comprises contacting the containers, immediately after forming and whilst they are still hot, with a thermally stable metal-organic compound in liquid form, subjecting the treated containers to a heat treamtent to cause the metal-organic compound to react with the glass and form a diffuse layer of reaction product within the glass surface, and treating the containers while at a temperature of at least 450° C. with a liquid or vapour metal compound which decomposes rapidly to produce a surface file of metal oxide. The metal-organic compound may be a compound of tin, titanium, cobalt, manganese or chromium. The liquid of vapour metal compound may be a compound of tin, titanium, iron, chromium or aluminium. A single reagent may produce both the metal-organic compound and the liquid or vapour metal compound.

---

This invention relates to the manufacture of glass containers, such as bottles, jars, tumblers, tableware and the like and is especially concerned with a method of manufacturing glass containers having substantial strength.

A number of methods have been proposed hitherto for improving the strength of glass containers. These include methods in which the glass containers are treated with a metal compound in liquid or vapour form immediately after they have been formed, and before they have been annealed. In one such method the hot containers are contacted with the vapour of a metal compound which rapidly decomposes on contact with the hot glass to produce a metal oxide film on the glass. This metal oxide film serves to protect the glass, after it has been cooled, from scratching and abrasion, and thereby prevents the loss of strength which would otherwise occur in an untreated bottle subjected to scratching and abrasion. Although treating a container in this way does not make it stronger at the point of manufacture, it does make it stronger in service, since it prevents, to a substantial extent, the container losing in use its original strength.

In another known method glass containers are contacted, immediately after formation, with a liquid metal-organic compound. They are then passed into the annealing lehr wherein decomposition and reaction between the metal-organic compound and the glass surface occurs, giving rise to a diffused layer of reaction product in the glass surface. A glass container manufactured in this way has increased strength at the point of manufacture.

In another method of improving the strength of a glass container, which is a refinement of the last-mentioned method, the liquid metal-organic compound is one which partially decomposes on contact with the hot glass to produce a metal compound which reacts rapidly with the hot glass to provide a metal oxide film, while the remainder reacts slowly with the glass while the glass is being annealed to produce a diffused layer of reaction product within the glass surface.

It is the object of the present invention to provide a method of manufacturing glass containers which are substantially stronger at the point of manufacture than are glass containers manufactured hitherto, both by conventional method and by methods involving intermediate treatment operations such as those outlined above.

According to the invention a method of manufacturing glass containers comprises the steps of:

(a) forming the containers in a forming machine;
(b) immediately thereafter, and whilst they are still hot from the forming, contacting the containers with a metal-organic compound in liquid form and of high thermal stability such that substantially no decomposition of the metal-organic compound takes place on contact;
(c) subjecting the containers treated as in (b) to a heat treatment to cause the metal-organic compound to react with the glass and form a diffuse layer of reaction product within the glass surface; and
(d) treating the containers while at a temperature of at least 450° C. with a metal compound in liquid or vapour form which decomposes rapidly on contact with the containers at the contacting temperature to produce a surface film of metal oxide.

The glass containers may subsequently be further treated, while at a temperature of 80–180° C., with an aqueous solution or emulsion of a polyoxyethylene glycol, a derivative thereof, or polyethylene. We have found that by means of this method glass containers may be produced which are substantially stronger than containers manufactured in accordance with the prior methods discussed above.

In essence the method of the invention may comprise three distinct stages following the initial forming step (a). In the first stage, step (b), the formed glass containers are treated with a metal-organic compound after which they are heated-treated in the second stage, so as to produce a diffuse layer of reaction product within the glass surface. Clearly, it is necessary to use for this purpose a metal compound which will permit such reaction to occur, and we have found that certain compounds of tin, titanium, cobalt, manganese and chromium are suitable for this purpose. These materials, dissolved in a suitable solvent, are suitably applied to the glass containers immediately after they leave the forming machine. Preferably the containers are transferred to a conveyor over a part of which is mounted a tunnel provided with a spray or sprays to which a constant supply of liquid material is pumped. Preferably at least two sprays are used, the flow rate through each spray being in the range 2–12 mls. per minute.

After passing through the application tunnel it is necessary, as the second stage, to heat-treat the containers to ensure maximum reaction of the applied metal-organic material with the glass, so as to obtain a diffuse layer. In practice they may be accomplished by passing the containers from the conveyor into an annealing lehr or other annealing enclosure where the "hot spot" temperature, i.e. the temperature at the hot end, is at least 20° C. higher than the annealing point of the glass. For most container glasses a hot spot temperature of 575° C. is suitable.

A suitable metal-organic compound of high thermal stability for use in the first stage of the method is a material prepared by reacting a tin tetrahalide, e.g. tin tetrachloride, with a lower alcohol, e.g. isopropanol, such that at no time during the reaction is the proportion of tin tetrahalide to alcohol greater than 33% w./w. The final material may contain between 1 and 10% by weight of tin, and preferably will contain about 4% w./w. of tin. Another suitable material is prepared by reacting titanium tetrachloride with a lower alkoxide of titanium, e.g. titanium tetrabutoxide, in alcohol solution such that the titanium represents between 1 and 10% by weight of the solution. Further suitable metal-organic compounds for use in step (b) are cobalt acetyl acetonate, manganese acetyl acetonate and chromium acetyl acetonate, and suitably when these materials are used they are dissolved in butyl acetate or a mixture of butyl acetate and dichloromethane to give a liquid containing between 1 and 10% by weight of the metal concerned.

In the third stage of the method according to this invention, i.e. step (d), the glass container surface is provided, additionally to the diffuse layer provided by the first and second stages, with a metal oxide non-diffuse layer. This is accomplished by treating the glass while it is at a temperature above 450° C. with a metal compound which reacts with the hot glass to give a metal oxide film. Suitable materials for this purpose include tin chloride vapour, titanium tetrachloride, ferric chloride dissolved in isopropanol and ferric acetyl acetonate dissolved in butyl acetate. Both of the last two reagents produce a ferric oxide surface film.

We have also found that an extremely suitable surface coating consists of aluminum oxide, and this may be produced by treating the containers with an aluminum oxide-producing material. Thus, further suitable materials for use in step (d) are aluminum chloride dissolved in isopropanol or butyl acetate, and aluminum acetyl acetonate dissolved in butyl acetate.

Application of the third stage (i.e. step (d)) material to the glass containers may be made by passing vapour of thte material into the annealing lehr at a point where the temperature of the containers is not less than 450° C. In such a case, it will be appreciated that the second and third stages of the method, i.e. steps (c) and (d), take place simultaneously.

The conditions of application of the third stage material will normally depend upon the material used and on the temperature at which it is applied. Such conditions should ensure that the final annealed, cooled container is not unduly iridescent, but possesses a surface which cannot readily be abraded by contact with a similarly treated surface. For example the annealing lehr may be equipped with sprays similar to those suggested for the first stage, to which is pumped sufficient material to create a mist or atmosphere of the material in a particular section of the lehr. The containers will be contacted with the material as they pass through this section of the lehr, and the material, upon reaction with the hot glass, will produce a metal oxide coating on the surfaces of the containers.

In certain cases it is possible to combine steps (b) and (d) into a single treatment stage, and to apply a composite treating material to the containers. Thus, if containers are treated, immediately after formation, with a solution containing manganese acetyl acetonate and iron acetyl acetonate, and are subsequently heat-treated by means of a normal annealing procedure (step (c)), the result is that both a surface film of metal oxide and also a diffuse layer within the glass surface are obtained. In this case the manganese acetyl acetonate is responsible for producing the diffuse layer whilst the iron acetyl acetonate produces a surface layer of ferric oxide. Generally speaking, it is possible to combine steps (b) and (d) into a single stage so long as the treating reagent contains or is able to produce, at one and the same time, a highly thermally stable metal-organic compound and a metal compound which decomposes rapidly on contact with hot glass, which account, respectively, for the diffuse layer and the surface film. A treating reagent containing chromium acetyl acetonate and iron acetyl acetonate, for example, is not suitable in this respect, since the presence of the iron compound counteracts the potential of the chromium compound to produce a diffuse layer. Such a treating reagent could, however, be used in step (d), to produce solely a surface film. Reagents containing manganese acetyl acetonate or chromium acetyl acetonate may also be useful for a combined step (b) and (d) treatment.

Another treating reagent which enables steps (b) and (d) to be combined is one prepared by dissolving ferric chloride in a tin tetrachloride-isopropanol reaction product such as is described above for use in the first stage (i.e. step (b)) of the process. A further such treating agent is one prepared by dissolving ferric chloride or ferric acetyl acetonate in a tin tetrachloride-butyl acetate reaction product. Yet a further suitable material for use in the combination of steps (b) and (d) is a solution prepared by reacting tin tetrachloride with butyl acetate and subsequently dissolving aluminum chloride in the mix. Such a material produces a surface coating on the glass article containing aluminum oxide, and a diffuse layer containing tin.

When steps (b) and (d) of the process are combined, the glassware is treated, immediately after formation, with the composite reagent, i.e. the reagent which will produce both the diffuse layer and the surface oxide layer, following which it is subjected to the heat treatment to promote the diffuse layer formation.

Preferably, when the containers have cooled to a temperature in the range 80°–180° C., a further treatment is applied, and this consists in the application to the annealed containers of a film of a polyoxyethylene glycol of high molecular weight or a monocarboxylic acid ester of such a polyethylene glycol, or of polyethylene. The material is suitably applied by spraying the containers with a solution or dispersion of the organic compound in water, and preferably is applied to the glass containers while they are at a temperature within the range 100–150° C. Suitable materials for this final treatment include polyethylene glycol marketed by Union Carbide Co. under the names Carbowax 1500, Carbowax 4000, and Carbowax 6000, a polyethylene glycol mono-stearate marketed by Atlas Chemicals under the name MYRJ 51/S, and polyethylene emulsions marketed by Owens-Illinois Inc. under the name Duracote and by Valchem Ltd. under the name Valsof.

The following Examples are given for the purpose of illustrating the invention.

Example 1

Glass bottles of oval shape were manufactured on a forming machine and passed on a conveyor through a hood wherein were situated two spray heads, one on either side of the conveyor. The bottles were subjected to treatment using a liquid prepared by reacting tin chloride with isopropyl alcohol, the final product containing 4% w./w. of tin, the flow rate through each spray being 10 mls. per minute. After emerging from the hood the bottles were passed into an annealing lehr wherein was maintained an atmosphere containing stannic chloride vapour.

After annealing, the bottles were clear and free from surface film or iridescence. Bursting pressure tests gave a mean of 132 p.s.i., compared with 48 p.s.i. obtained on untreated bottles, 90 p.s.i. on bottles treated in the hood but not in the annealing lehr, and 70 p.s.i. on bottles treated in the annealing lehr but not in the hood.

Example 2

Cylindrical bottles were manufactured and treated as described in Example 1, except that after annealing they were treated with a 0.1% aqueous solution of polyethylene glycol of molecular weight approximately 4000. This latter treatment was carried out using a single travelling spray head situated above the bottles, and the flow rate and speed were set such as to provide a coating on the bottles containing between 1 and 5 $\mu$g. polyethylene glycol per cm.$^2$ of glass surface.

The bottles so obtained were given a standard abrasion by causing two like treated bottles to be scratched together under a force of 50 lbs. weight. The scratched bottles were then impacted such that on increasing the impact level fracture occurred originating at a point through which the scratch passed. The treated bottles withstood a mean impact velocity of 64 inches per second, compared with 45 inches per second for untreated bottles, 53 inches per second for bottles treated in the hood but not in the annealing lehr, and 47 inches per second for bottles treated in the annealing lehr but not in the hood.

Example 3

Glass containers, immediately after forming, were treated with a solution prepared by reacting tin tetrachloride and n-butyl acetate, the final solution containing 10% Sn (w./v.), the liquid being applied to the containers through two sprays, one on either side of a treatment tunnel straddling the conveyor. The throughput through each spray was 2.5 mls./min. After treatment the containers were passed into an annealing lehr in which they were subjected to a normal annealing treatment. They were finally treated with a 0.1 (w./v.) solution of polyethylene glycol.

When cool the containers were tested by bursting to destruction with hydraulic pressure, and after noting the origin of fracture and the thickness at the point of fracture, the bursting strengths of the glass were calculated. Before testing, bottles were scratched one against the other at one of two loads, the low load in order to localise the fracture, and the high load in order to severely damage the glass.

In a second group of experiments, bottles were similarly treated with a solution prepared by dissolving ferric chloride in butyl acetate, such that the solution contained 3% Fe (w./v.), and in a third group bottles were treated with a solution prepared by reacting tin tetrachloride with butyl acetate and subsequently dissolving ferric chloride in the mix, the final material containing 10% Sn and 3% Fe (w./v.).

The following Table shows the median bursting strengths obtained in each case (and also for bottles treated solely with polyethylene glycol), and it can be seen that the application of the composite treating reagent, combining steps (b) and (d), provided greatly improved strength at both the low and high scratch loads, indicating the effect of the diffuse and surface layers respectively.

| Treatment reagent | Bursting strength (Mn m.$^{-2}$) | |
|---|---|---|
| | Low load | High load |
| Polyethylene glycol (PEG) | 17.7 | 12.4 |
| Tin tetrachloride/n-butyl acetate + PEG | 20.8 | 16.2 |
| Iron chloride/butyl acetate + PEG | 18.5 | 16.4 |
| Tin tetrachloride/butyl acetate/ferric chloride PEG | 22.5 | 19.6 |

Example 4

Bottles were treated and tested as described in Example 3 except that in this case they were treated with (a) an 18% (w./v.) solution of manganese acetyl acetonate in a solvent containing 70% n-butyl acetate and 30% dichloromethane, (b) a 16% (w./v.) solution of iron acetyl acetonate in a butyl acetate/dichloromethane solvent, and (c) a composite treating agent containing both manganese and iron acetyl acetonates (18% and 16% w./v. respectively) in this solvent.

The following Table shows the median bursting strengths of the treated bottles at high and low abrasion loads, and again it can be seen that the manganese/iron treating solution gave improvement at both low and high scratch loads corresponding to the presence of a diffuse film and a surface layer respectively.

| Test | Bursting strength (Mn, m.$^{-2}$) | |
|---|---|---|
| | Low load | High load |
| PEG only | 16.2 | 13.2 |
| (a) | 17.8 | 13.4 |
| (b) | 16.5 | 14.5 |
| (c) | 18.0 | 15.1 |

Example 5

Glass containers, immediately after forming, were treated with a solution prepared by reacting tin tetrachloride and n-butyl acetate, the final solution containing 10% Sn (w./v.), the liquid being applied to the containers through two sprays, one on either side of a treatment tunnel straddling the conveyor. The throughput through each spray was 2.5 mls./min. After treatment the containers were passed into an annealing lehr in which they were subjected to a normal annealing treatment. They were finally treated with a 0.1% (w./v.) solution of polyethylene glycol.

When cool the containers were tested by bursting to destruction with hydraulic pressure, and after noting the origin of fracture and the thickness at the point of fracture, the bursting strengths of the glass were calculated. Before testing, bottles were scratched one against the other at one of two loads, the low load in order to localise the fracture, and the high load in order to severely damage the glass.

In a second group of experiments, bottles were similarly treated with a solution prepared by dissolving aluminium chloride in butyl acetate, such that the solution contained 3% Al (w./v.), and in a third group bottles were treated with a solution prepared by reacting tin tetrachloride with butyl acetate and subsequently dissolving aluminium chloride in the mix, the final material containing 10% Sn and 3% Al (w./v.).

The following Table shows the median bursting strengths obtained in each case (and also for bottles treated solely with polyethylene glycol), and it can be seen that the application of the composite treating reagent provided greatly improved strength at both the low and high scratch loads, indicating the effect of the diffuse and surface layers respectively.

| Treatment reagent | Bursting strength (Mn, m.$^{-2}$) | |
|---|---|---|
| | Low load | High load |
| Polyethylene glycol (PEG) | 17.7 | 12.4 |
| Tin tetrachloride/n-butyl acetate + PEG | 20.8 | 16.2 |
| Aluminum chloride/butyl acetate + PEG | 18.0 | 16.0 |
| Tin tetrachloride/butyl acetate/aluminum chloride + PEG | 22.0 | 19.5 |

What is claimed is:

1. A method of manufacturing glass containers comprising the steps of:
   (a) forming the containers in a forming machine;
   (b) immediately thereafter, and while they are still hot from the forming, contacting the containers with a metal-organic compound in liquid form and of high thermal stability such that substantially no decomposition of the metal-organic compound takes place on contact;
   (c) subjecting the containers treated as in (b) to a heat treatment to cause the metal-organic compound to react with the glass and form a diffuse layer of reaction product within the glass surface; and
   (d) treating the containers while at a temperature of at least 450° C. with an organo-aluminium compound which decomposes rapidly on contact with the containers at the contacting temperature to produce a surface film of aluminium oxide.

2. A method according to claim 1 wherein in step (d) the containers are treated with a reagent selected from (i) aluminium chloride dissolved in isopropanol or butyl acetate and (ii) aluminium acetyl acetonate dissolved in butyl acetate.

3. A method of manufacturing glass containers comprising the steps of:
   (a) forming the containers in a forming machine;
   (b) immediately thereafter, and while they are still hot from the forming, contacting the containers with a reagent comprising (i) a metal-organic compound in liquid form and of high thermal stability such that substantially no decomposition of the metal-organic compound takes place on contact, and (ii) a metal compound in liquid or vapor form which decomposes rapidly on contact with the containers at the contacting temperature to produce a surface film of metal oxide; and (c) subjecting the containers treated as in (b) to a heat treatment to cause the metal-organic compound to react with the glass and form a diffuse layer of reaction product within the glass surface, said diffuse layer and surface film of metal oxide being selected from the group consisting of manganese and iron, manganese and chromium, tin and iron and tin and aluminium.

4. A method according to claim 3 wherein, immediately after formation, the containers are treated with a reagent prepared by dissolving ferric chloride in a tin tetrachloride-isopropanol reaction product.

5. A method according to claim 3 wherein, immediately after formation, the containers are treated with a reagent prepared by dissolving ferric chloride or ferric acetyl acetonate in a tin tetrachloride-butyl acetate reaction product.

6. A method according to claim 3 wherein, immediately after formation, the containers are treated with a reagent prepared by reacting tin tetrachloride with butyl acetate and dissolving aluminium chloride in the reaction product.

References Cited

UNITED STATES PATENTS

| 3,004,875 | 10/1961 | Lytle | 65—60 X |
|---|---|---|---|
| 3,411,934 | 11/1968 | Englehart et al. | 65—30 X |
| 3,451,795 | 6/1969 | Budd | 65—60 X |
| 3,656,922 | 4/1972 | Budd | 65—60 X |

ROBERT L. LINDSAY, Primary Examiner

U.S. Cl. X.R.

65—30; 117—88, 124 A